United States Patent
Lu et al.

(10) Patent No.: US 10,690,935 B2
(45) Date of Patent: *Jun. 23, 2020

(54) LENS DRIVING MODULE HAVING HALL SENSOR AND MAGNET IN ALIGNMENT ALONG A DIRECTION PARALLEL TO OPTICAL AXIS

(71) Applicant: LARGAN PRECISION CO., LTD., Taichung (TW)

(72) Inventors: Chun-Yi Lu, Taichung (TW); Te-Sheng Tseng, Taichung (TW); Wen-Hung Hsu, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/217,256

(22) Filed: Dec. 12, 2018

(65) Prior Publication Data

US 2019/0113767 A1    Apr. 18, 2019

Related U.S. Application Data

(63) Continuation of application No. 14/525,390, filed on Oct. 28, 2014, now Pat. No. 10,197,812.

(30) Foreign Application Priority Data

Sep. 18, 2014 (TW) .............................. 103216584 U

(51) Int. Cl.
| | |
|---|---|
| *G02B 7/08* | (2006.01) |
| *G02B 27/64* | (2006.01) |
| *H04N 5/232* | (2006.01) |
| *G02B 7/09* | (2006.01) |

(52) U.S. Cl.
CPC ............. *G02B 27/646* (2013.01); *G02B 7/08* (2013.01); *G02B 7/09* (2013.01); *H04N 5/23287* (2013.01)

(58) Field of Classification Search
CPC .......... G02B 3/10; G02B 7/023; G02B 7/026; G02B 7/04; G02B 7/09; G02B 13/001; G02B 27/64; G02B 27/646; G03B 5/00; G03B 5/02; G03B 5/04; G03B 5/06; G03B 5/08; G03B 2205/0007; G03B 2205/0015; G03B 2205/0023; G06T 5/003;

(Continued)

(56) References Cited

U.S. PATENT DOCUMENTS

| | | |
|---|---|---|
| 8,396,357 B2 | 3/2013 | Yanagisawa et al. |
| 8,531,534 B2 | 9/2013 | Hu et al. |
| 8,670,195 B2 | 3/2014 | Ikushima et al. |

(Continued)

*Primary Examiner* — Ryan S Dunning
(74) *Attorney, Agent, or Firm* — McClure, Qualey & Rodack, LLP

(57) ABSTRACT

A lens driving module includes a holder, a cover, a carrier, at least one first magnet, a first coil, at least two second magnets, at least one first sensor and at least one second sensor. The holder includes an opening hole. The cover is made of metal material and coupled to the holder. The carrier is movably disposed in the cover and for coupling to a lens. The first magnet is movably disposed in the cover. The first coil is wound around an outer side of the carrier. The second magnets are disposed on one end of the carrier. The first sensor is for detecting a magnetic field of the second magnets. The second sensor is for detecting a magnetic field of the first magnet.

25 Claims, 13 Drawing Sheets

(58) Field of Classification Search
CPC ...... G06T 2207/20201; H04N 5/23264; H04N 5/2328; H04N 5/23287
USPC ..... 348/208.99, 208.4, 208.5, 208.7, 208.11, 348/208.12; 359/554–557, 819, 822–826; 396/52, 55
See application file for complete search history.

(56) References Cited

U.S. PATENT DOCUMENTS

| | | |
|---|---|---|
| 10,197,812 B2 * | 2/2019 | Lu .......................... G02B 7/08 |
| 2011/0141564 A1 | 6/2011 | Sata et al. |
| 2014/0177056 A1 | 6/2014 | Hayashi et al. |
| 2014/0327965 A1 * | 11/2014 | Chen ................. G02B 13/001 359/557 |
| 2015/0331251 A1 | 11/2015 | Hu et al. |

* cited by examiner

LENS DRIVING MODULE HAVING HALL SENSOR AND MAGNET IN ALIGNMENT ALONG A DIRECTION PARALLEL TO OPTICAL AXIS

RELATED APPLICATIONS

The present application is a continuation of the application Ser. No. 14/525,390, filed Oct. 28, 2014, now U.S. Pat. No. 10,197,812, which claims priority to Taiwan Application Serial Number 103216584, filed Sep. 18, 2014, which is herein incorporated by reference.

BACKGROUND

Technical Field

The present disclosure relates to a lens driving module. More particularly, the present disclosure relates to a lens driving module applicable to mobile terminals.

Description of Related Art

In general, the voice-coil motor (VCM) cooperated to an open-loop controlling method is applied to the lens for providing an auto-focusing. However, the conventional VCM cannot provide feedback signal to the actuator during moving the lens, so that the present position of the lens cannot be notified immediately. Hence, the lens should be moved to the original position before focusing every time, that is, the focusing time would be lengthened and the operation would not be fluency.

Furthermore, it is inevasible for camera shake during operation. However, the lens can be merely moved in the direction parallel to the lens and cannot be moved in the direction orthogonal to the lens via the conventional VCM. Hence, it cannot compensate for the shaking drift amount from the camera shake to get stable image so as to degrade the shooting result and affect the shooting experience.

SUMMARY

According to one aspect of the present disclosure, a lens driving module includes a holder, a cover, a carrier, at least one first magnet, a first coil, at least two second magnets, at least one first sensor and at least one second sensor. The holder includes an opening hole. The cover is made of metal material and coupled to the holder. The carrier is movably disposed in the cover and for coupling to a lens, wherein a moving direction of the carrier includes a first direction which is parallel to an optical axis of the lens. The first magnet is movably disposed in the cover, wherein a moving direction of the first magnet includes a second direction which is orthogonal to the optical axis of the lens. The first coil is wound around an outer side of the carrier and adjacent to the first magnet. The second magnets are disposed on one end of the carrier which is toward the holder. The first sensor is a Hall sensor, and for detecting a magnetic field of any one of the second magnets, wherein the magnetic field is varied according to a relative displacement between the first sensor and the second magnet which is detected. The second sensor is for detecting a magnetic field of the first magnet, wherein the magnetic field is varied according to a relative displacement between the second sensor and the first magnet which is detected.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
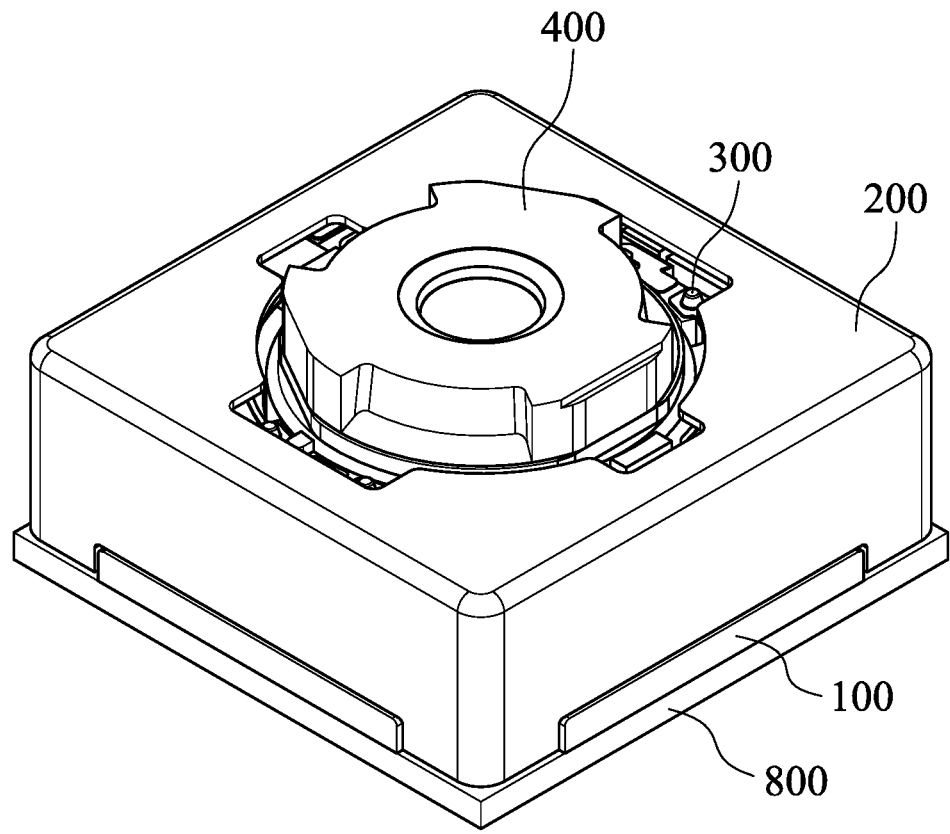
FIG. 1 shows an external schematic view of a lens driving module according to the 1st embodiment of the present disclosure.
Figure 2:
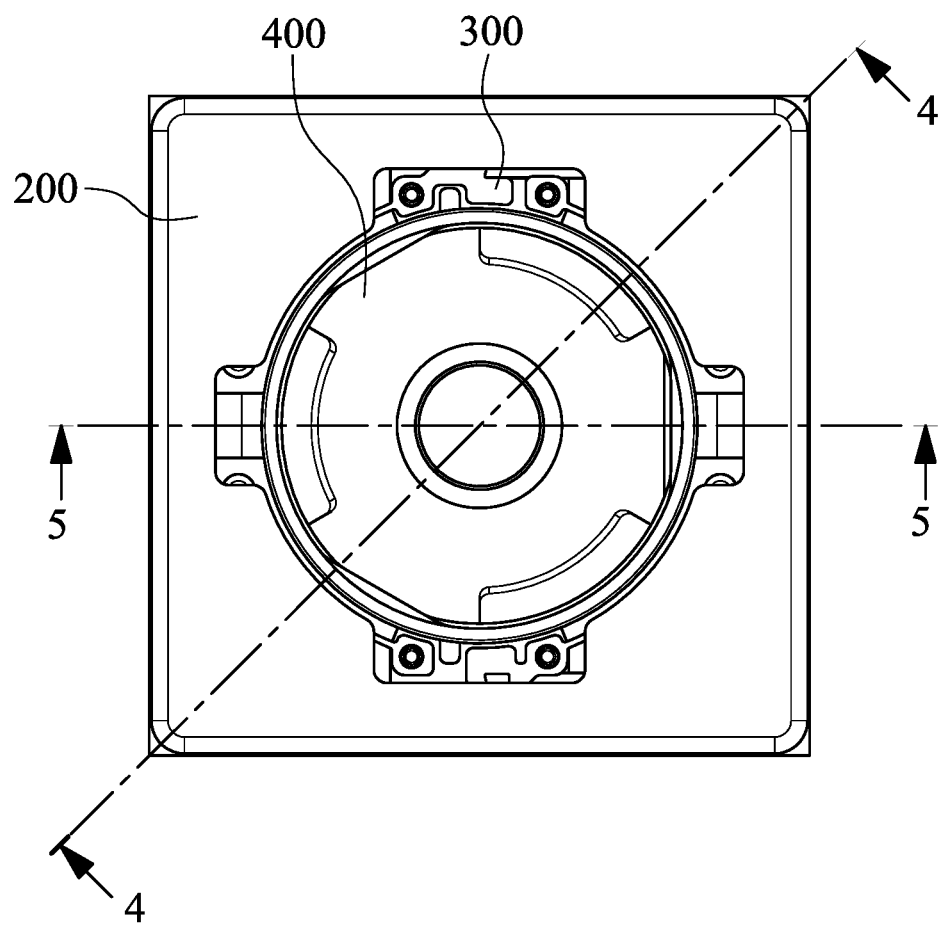
FIG. 2 shows a top view of the lens driving module according to the 1st embodiment.
Figure 3:
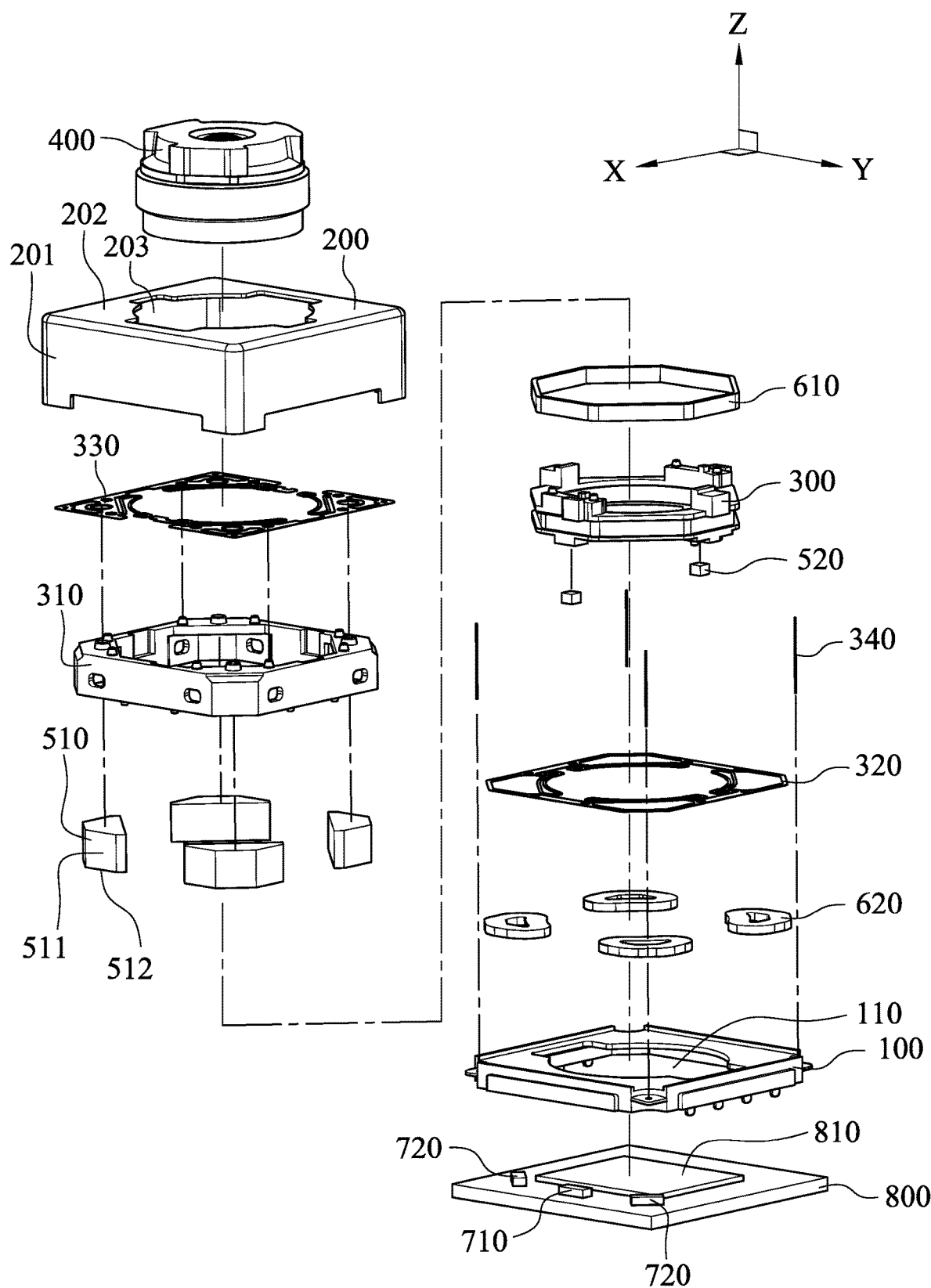
FIG. 3 shows an exploded view of the lens driving module according to the 1st embodiment.

FIG. 1 shows an external schematic view of a lens driving module according to the 1st embodiment of the present disclosure. FIG. 2 shows a top view of the lens driving module according to the 1st embodiment. FIG. 3 shows an exploded view of the lens driving module according to the 1st embodiment. The lens driving module includes a holder 100, a cover 200, a carrier 300, at least one first magnet 510, a first coil 610, at least two second magnets 520, at least one first sensor 710 and at least one second sensor 720. In FIG. 1, the components of the lens driving module can be covered by the cover 200, and the cover 200 is coupled to the holder 100, so that the lens driving module can be applied to the electronic product, and the components can be separated from the external environment.

In detail, the holder 100 includes an opening hole 110, the cover 200 is made of metal material and coupled to the holder 100. In FIG. 3, the cover 200 is cube-shaped and includes four side walls 201 formed into closed-shape. One end of the cover 200 is an end wall 202 which includes an opening 203, wherein the end wall 202 is connected to the side walls 201. The other end of the cover 200 is an open end and for coupling to the holder 100. Therefore, a lens 400 can be movably disposed through the opening 203 of the end wall 202 of the cover 200 which is corresponding to the opening hole 110 of the holder 100.

The carrier 300 is movably disposed in the cover 200, and for coupling to the lens 400, wherein a moving direction of the carrier 300 includes a first direction Z which is parallel to an optical axis of the lens 400. That is, the carrier 300 and the lens 400 can be moved between the opening 203 of the end wall 202 of the cover 200 and the opening hole 110 of the holder 100 along the first direction Z. The lens 400 applied to the lens driving module of the present disclosure can include at least five lens elements with refractive power so as to provide higher resolution.

The first magnets 510 are movably disposed in the cover 200, wherein a moving direction of the first magnets 510 includes a second direction X which is orthogonal to the optical axis of the lens 400. The first coil 610 is wound around an outer side of the carrier 300 and adjacent to the first magnets 510. In FIG. 3, a number of the first magnets 510 of the lens driving module in the 1st embodiment is four, wherein each of the first magnets 510 is movably disposed in the cover 200 which is corresponding to each of four corners of the cover 200 respectively. Therefore, the first magnets 510 are equidistantly adjacent to the first coil 610.

Figure 4:
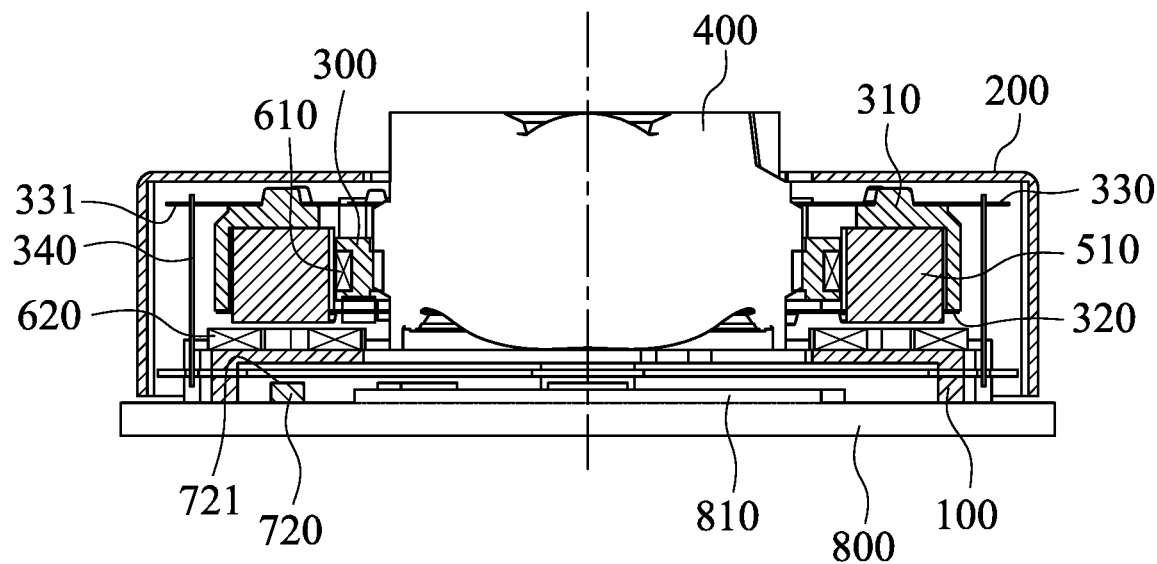
FIG. 4 shows a sectional view of the lens driving module along the sectional line 4-4 of FIG. 2.

FIG. 4 shows a sectional view of the lens driving module along the sectional line 4-4 of FIG. 2. In FIG. 4, the lens driving module can further include a spacer 310 connected to the first magnets 510, wherein the carrier 300 is disposed in the spacer 310. Due to the first magnets 510 is connected to and moved via the spacer 310, the first magnets 510 can be moved stably and the compact size of the lens driving module can be maintained.

Figure 5:
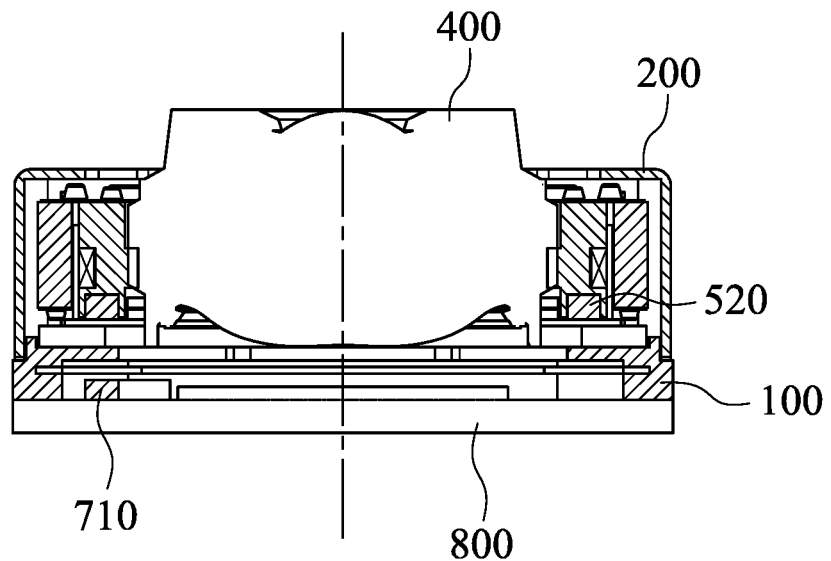
FIG. 5 shows a sectional view of the lens driving module along the sectional line 5-5 of FIG. 2.

At least two second magnets 520 are disposed on one end of the carrier 300 which is toward the holder 100. A number of the second magnets 520 can be two to six, and any two second magnets 520 which are adjacent to each other can be equidistantly disposed on the end of the carrier 300 in a circumferential direction. In the 1st embodiment, the lens driving module includes two second magnets 520. FIG. 5 shows a sectional view of the lens driving module along the sectional line 5-5 of FIG. 2. In FIG. 5, the second magnets 520 are symmetrically disposed on the end of the carrier 300 which is toward the holder 100. Therefore, it is favorable for reducing the complexity of mechanism and increasing the assembling yield rate.

The first sensor 710 which is a Hall sensor. During a focusing procedure of the lens 400, the first sensor 710 is for detecting a magnetic field of any one of the second magnets 520. When the magnetic field is varied according to a relative displacement in the first direction Z between the first sensor 710 and the second magnet 520 which is moved with the carrier 300 is detected by the first sensor 710, the first sensor 710 provides a feedback voltage signal to an electronic driver (not shown) corresponding to a position of the lens 400. Therefore, an output current can be provided by the electronic driver for moving the lens 400 to a predetermined position without moving back to the original position.

During the focusing procedure of the lens 400, the second sensor 720 is for detecting a magnetic field of any one of the first magnets 510. When the magnetic field is varied according to a relative displacement in the second direction X between the second sensor 720 and the first magnet 510 is detected by the second sensor 720, the second sensor 720 provides another feedback voltage signal to another electronic driver corresponding to a shaking drift amount of lens 400. Therefore, another output current is provided by the electronic driver to compensate the shaking drift amount of the lens 400 so as to reduce the problems related to camera shake during operating mobile terminals. In the 1st embodiment, a number of the second sensor 720 is two, and the second sensors 720 can be Hall sensors so as to increase resolutions of shake detecting.

In the 1st embodiment, the lens driving module can further include an imaging element 810 and a circuit board 800, wherein the imaging element 810 is for receiving an imaging light of the lens 400, and the imaging element 810 and the first sensor 710 are disposed on the circuit board 800. Therefore, it is favorable for increasing the manufacturing efficiency of the lens driving module.

In FIG. 3, the first sensor 710 and the second sensors 720 can be disposed on the circuit board 800 and near the opening hole 110 of the holder 100, wherein the second sensors 720 is adjacent to one side of the first magnet 510 which is toward the holder 100. Therefore, it is favorable for increasing the manufacturing efficiency.

Furthermore, the lens driving module can further include at least one first spring 320 and at least one second spring 330. The first spring 320 is coupled to the end of the carrier 300 which is toward the holder 100, the second spring 330 is coupled to the other end of the carrier 300, wherein the first spring 320 and the second spring 330 are both coupled to the spacer 310. In FIG. 3, a number of the first spring 320 is one and a number of the second spring 330 is two. When the lens 400 is moved with the carrier 300, a degree of freedom in the first direction Z of the movement of the lens 400 can be provided by the first spring 320 and the second springs 330. The first spring 320 and the second springs 330 are deformed as the carrier 300 moved and provide a restoring force to the carrier 300 during the carrier 300 moved to an original position.

For further providing the compensation of the shaking drift amount from camera shake, the moving direction of the carrier 300 further includes the second direction X and a third direction Y, wherein the first direction Z, the second direction X and the third direction Y are orthogonal to each other. Moreover, the lens driving module can further include at least three suspension wires 340, wherein one end of each of the suspension wires 340 is connected to a suspension plane 331 which is orthogonal to the optical axis of the lens 400, and the suspension wires 340 are arranged in the same direction which is parallel to the optical axis of the lens 400. In FIG. 3 and FIG. 4, a number of the suspension wires 340 in the lens driving module is four, wherein the suspension wires 340 are made of metal material and have elasticity. The end of each suspension wires 340 is connected to the suspension plane 331 which is one side toward to the holder 100 of the second spring 330, and another end of each suspension wires 340 is connected to the holder 100. Therefore, the suspension wires 340 not only provide the degrees of freedom of the movement of the carrier 300 orthogonal to the optical axis of the lens 400, but also restrict the shifting range of the suspension wires 340, wherein the suspension wires 340 can further be served as conductive wires.

Moreover, the moving direction of each of the first magnets 510 further includes the third direction Y. Therefore, it is favorable for maintaining the accuracy of the lens driving module. Each of the first magnets 510 includes at least one first parallel surface 511 and at least one first orthogonal surface 512, wherein the first parallel surface 511 is parallel to the optical axis of the lens 400, and the first orthogonal surface 512 is orthogonal to the optical axis of the lens 400. In FIG. 3, each of the first magnets 510 is a hexagonal cylinder, wherein each of the first magnets 510 includes two orthogonal surfaces 512 and six first parallel surfaces 511.

Furthermore, the lens driving module can further include at least one second coil 620 which is adjacent to the first magnets 510. Hence, the carrier 300 and the first magnets 510 can be moved in the second direction X. The number of the first magnets 510 and a number of the second coil 620 can be equal, and the number of the first magnets 510 and the number of the second coil 620 can be both at least four. Therefore, the carrier 300 and the first magnets 510 are driven by the second coil 620 averagely and stably, and the compact size of the lens driving module can be maintained. In FIG. 3, the number of the first magnets 510 and the number of the second coil 620 are both four. Each of the second coils 620 can be a band coil being closed loop and includes an enclosed space inside, wherein the second sensors 720 can be disposed on the circuit board 800 and corresponding to the enclosed spaces inside the second coils 620.

In detail, the second coils 620 can be disposed on the holder 100 and near the opening hole 110. Each of the second coils 620 is adjacent to the side of each of the first magnets 510 which is toward the holder 100, that is, each of the second coils 620 is adjacent to the first orthogonal surfaces 512 of each of the first magnets 510.

Figure 6A:
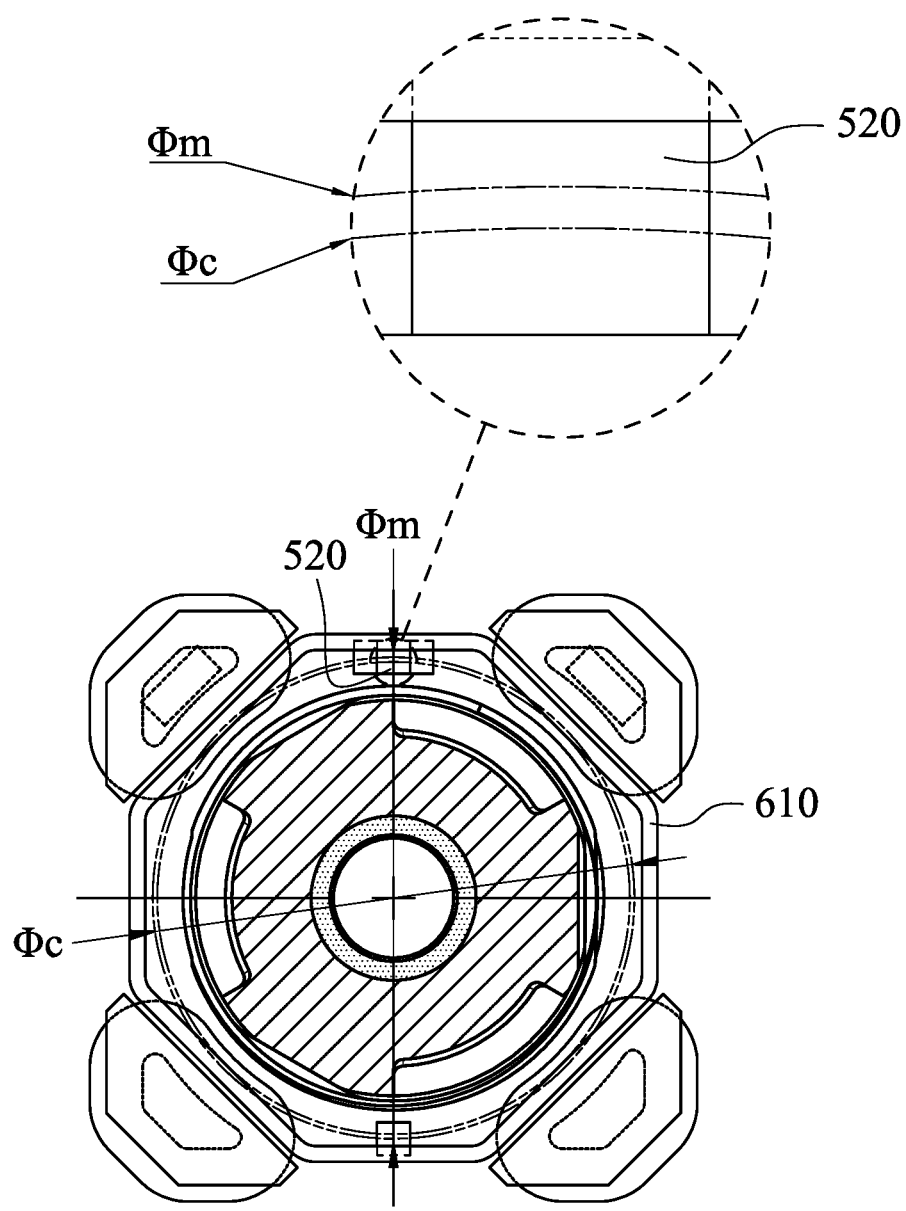
FIG. 6A is a schematic view showing the parameters Φc and Φm of the lens driving module according to the 1st embodiment.
Figure 6B:
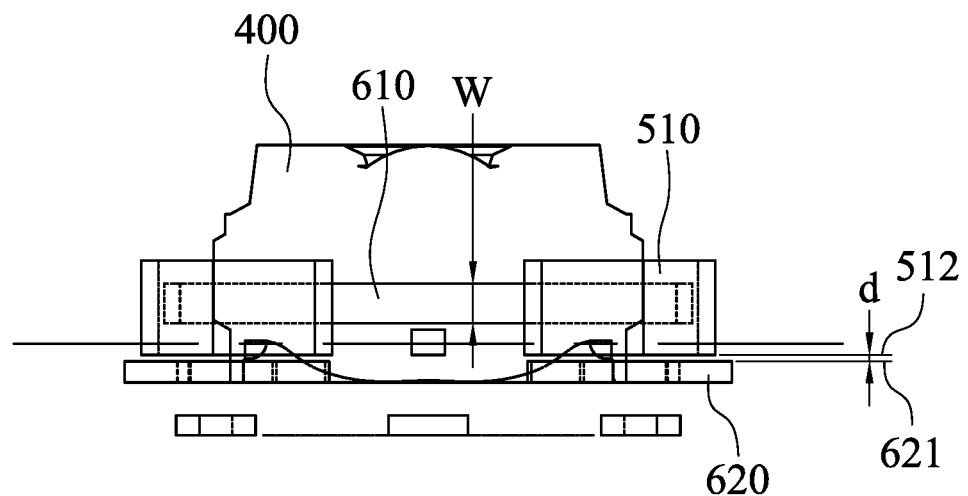
FIG. 6B is a schematic view showing the parameters d and W of the lens driving module according to the 1st embodiment.

FIG. 6A is a schematic view showing the parameters Φc and Φm of the lens driving module according to the 1st embodiment. FIG. 6B is a schematic view showing the parameters d and W of the lens driving module according to the 1st embodiment. In FIG. 6A and FIG. 6B, when a diameter of a smallest inscribed circle with a center of the first coil 610 is Φc, a diameter which is a greatest straight-line distance between the centers of any two of the second magnets 520 is Φm, and a width parallel to the optical axis of the lens 400 of the first coil 610 is W, the following condition is satisfied: |Φc−Φm|/2<W. Therefore, it is favorable for maintaining the compact size of the lens driving module and reducing the complexity of mechanism.

Figure 6C:
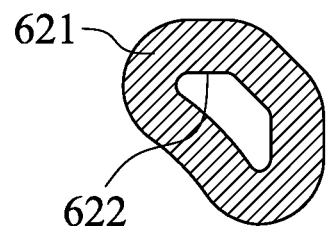
FIG. 6C is a schematic view showing the parameters A and B of the lens driving module according to the 1st embodiment.

In FIG. 6B, each of the second coils 620 includes a ring plane 621 which is orthogonal to the optical axis of the lens 400 and toward the first magnet 510. When a smallest air gap which is parallel to the optical axis of the lens 400 between the ring plane 621 of one of the second coils 620 and the first orthogonal surface 512 of one of the first magnet 510 which is toward the second coil 620 is d, the following condition is satisfied: d<0.7 mm. Therefore, the efficiency of the carrier 300 driven by the second coil 620 is increased so as to achieve the advantages of power saving and compact size. FIG. 6C is a schematic view showing the parameters A and B of the lens driving module according to the 1st embodiment. Each of the second coils 620 includes a ring plane 621 which is orthogonal to the optical axis of the lens 400 and toward each of the first magnets 510. When an area of the ring plane 621 is A, the following condition is satisfied: 2.3 mm$^2$<A<8.5 mm$^2$. Therefore, it is favorable for balancing the sensitivity and the power consumption during the carrier 300 driven by the second coils 620.

In FIG. 6C, each of the second coils 620 includes the ring plane 621 and an enclosed plane 622. The ring plane 621 is orthogonal to the optical axis of the lens 400 and toward each of the first magnets 510. The enclosed plane 622 is enclosed by the ring plane 621. When an area of the enclosed plane 622 is B, the following condition is satisfied: 0.5 mm$^2$<B<2.9 mm$^2$. Therefore, it is favorable for maintaining the sensitivity of the second coils 620.

In FIG. 4, each of the second sensors 720 includes a second sensor surface 721 which is orthogonal to the optical axis of the lens 400. When an area of the second sensor surface 721 is C, the following condition is satisfied: 0.35 mm$^2$<C<1.5 mm$^2$. Therefore, it is favorable for maintaining the compact size of the lens driving module. Preferably, the following condition is satisfied: 0.35 mm$^2$<C<1.0 mm$^2$.

In the 1st embodiment of the present disclosure, the diameter of the smallest inscribed circle of the first coil 610 (Φc), the diameter which is the greatest straight-line distance between the centers of any two of the second magnets 520 (Φm), the data of |Φc−Φm|/2, the width parallel to the optical axis of the lens 400 of the first coil 610 (W), the smallest air gap which is parallel to the optical axis of the lens 400 between the ring plane 621 of the second coil 620 and the first orthogonal surface 512 of the first magnet 510 (d), the area of the ring plane 621 (A), the area of the enclosed plane 622 (B), and the area of the second sensor surface 721 (C) are listed in the following Table 1.

TABLE 1

| 1st Embodiment | | | |
|---|---|---|---|
| Φc (mm) | 7.16 | d (mm) | 0.10 |
| Φm (mm) | 7.30 | A (mm) | 5.70 |
| |Φc − Φm|/2 (mm) | 0.07 | B (mm) | 1.14 |
| W (mm) | 0.60 | C (mm) | 1.28 |

Figure 7A:
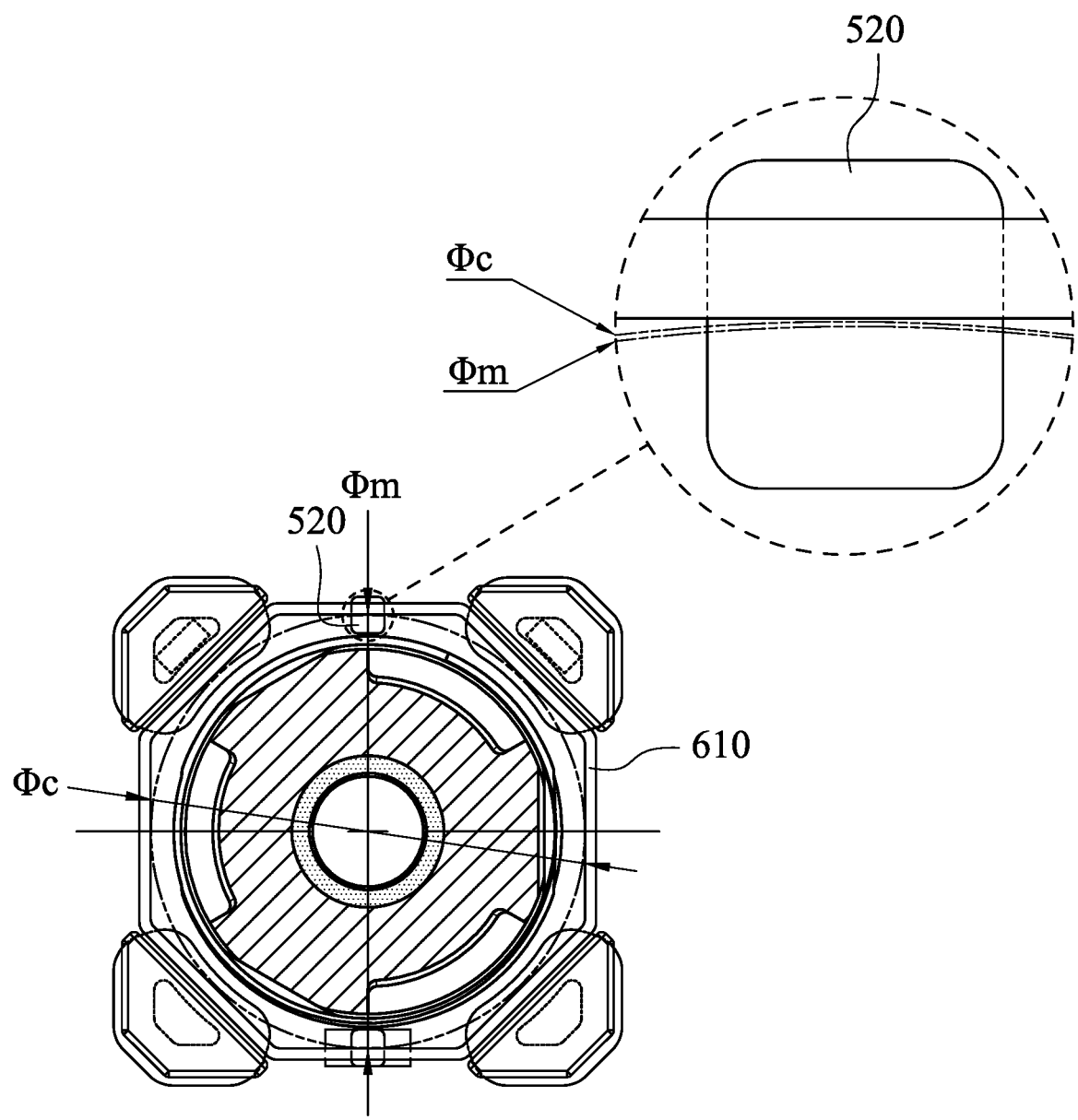
FIG. 7A is a schematic view showing the parameters Φc and Φm of the lens driving module according to the 2nd embodiment.
Figure 7B:
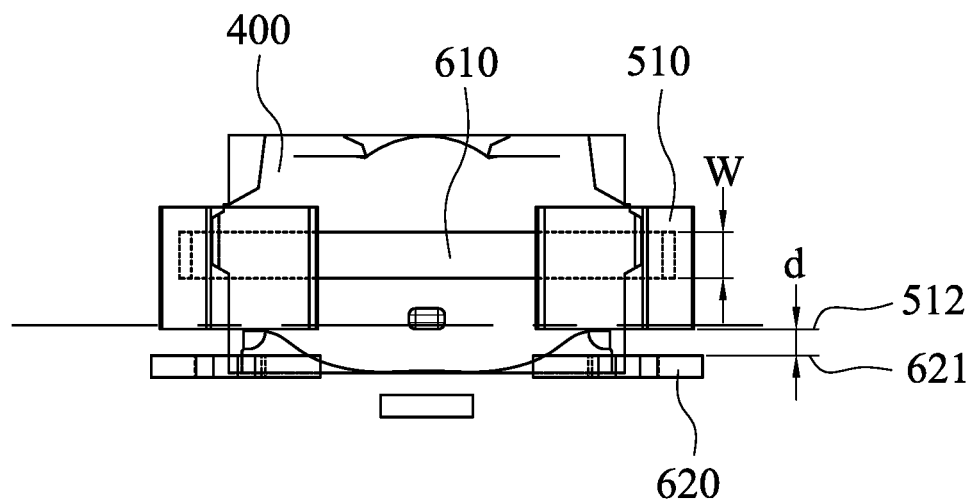
FIG. 7B is a schematic view showing the parameters d and W of the lens driving module according to the 2nd embodiment.
Figure 7C:
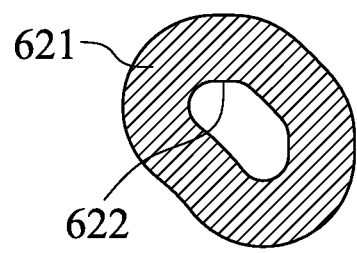
FIG. 7C is a schematic view showing the parameters A and B of the lens driving module according to the 2nd embodiment.

FIG. 7A is a schematic view showing the parameters Φc and Φm of the lens driving module according to the 2nd embodiment. FIG. 7B is a schematic view showing the parameters d and W of the lens driving module according to the 2nd embodiment. FIG. 7C is a schematic view showing the parameters A and B of the lens driving module according to the 2nd embodiment. The elements arrangement in the 2nd embodiment is the same as the 1st embodiment, and will not be described again herein.

In the 2nd embodiment of the present disclosure, the diameter of the smallest inscribed circle of the first coil 610 (Φc), the diameter which is the greatest straight-line distance between the centers of any two of the second magnets 520 (Φm), the data of |Φc−Φm|/2, the width parallel to the optical axis of the lens 400 of the first coil 610 (W), the smallest air gap which is parallel to the optical axis of the lens 400 between the ring plane 621 of the second coil 620 and the first orthogonal surface 512 of the first magnet 510 (d), the area of the ring plane 621 (A), the area of the enclosed plane 622 (B), and the area of the second sensor surface 721 (C) are listed in the following Table 2.

TABLE 2

2nd Embodiment

| Φc (mm) | 7.13 | d (mm) | 0.40 |
|---|---|---|---|
| Φm (mm) | 7.12 | A (mm) | 7.83 |
| \|Φc − Φm\|/2 (mm) | 0.00 | B (mm) | 1.48 |
| W (mm) | 0.70 | C (mm) | 0.60 |

Figure 8A:
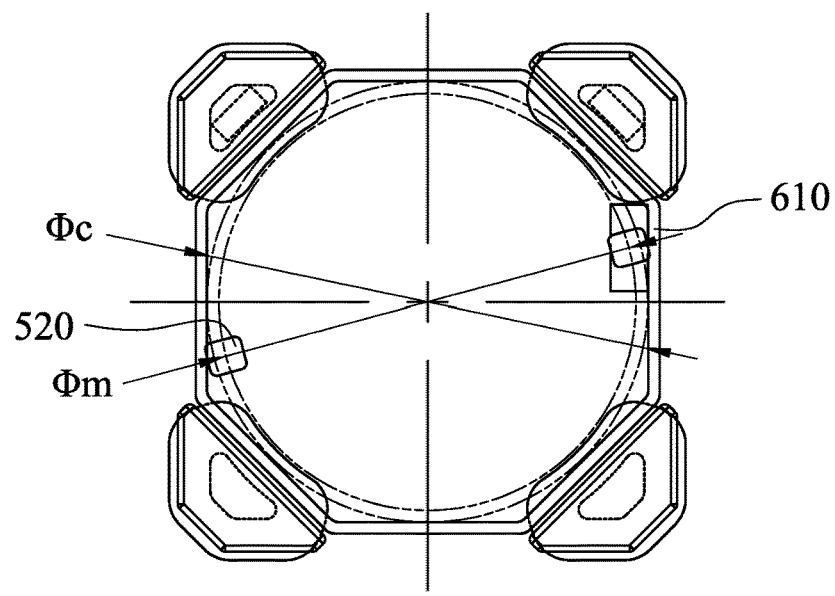
FIG. 8A is a schematic view showing the parameters Φc and Φm of the lens driving module according to the 3rd embodiment.
Figure 8B:
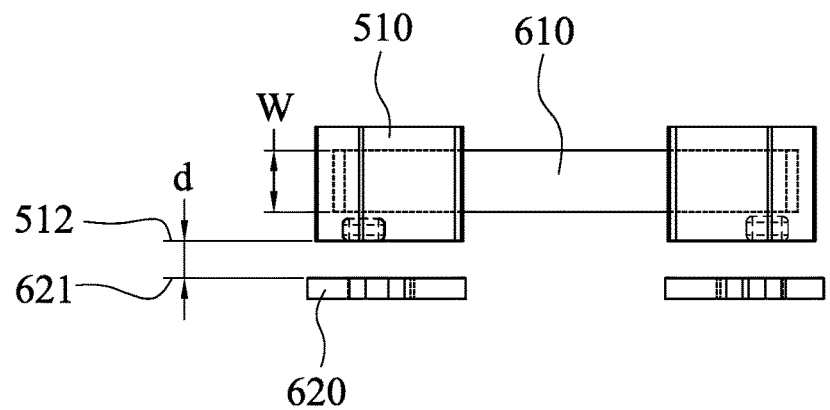
FIG. 8B is a schematic view showing the parameters d and W of the lens driving module according to the 3rd embodiment.
Figure 8C:
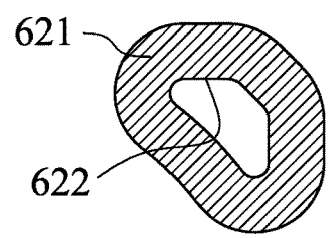
FIG. 8C is a schematic view showing the parameters A and B of the lens driving module according to the 3rd embodiment.

FIG. 8A is a schematic view showing the parameters Φc and Φm of the lens driving module according to the 3rd embodiment. FIG. 8B is a schematic view showing the parameters d and W of the lens driving module according to the 3rd embodiment. FIG. 8C is a schematic view showing the parameters A and B of the lens driving module according to the 3rd embodiment. The elements arrangement in the 3rd embodiment is the same as the 1st embodiment, and will not be described again herein.

In the 3rd embodiment of the present disclosure, the diameter of the smallest inscribed circle of the first coil 610 (Φc), the diameter which is the greatest straight-line distance between the centers of any two of the second magnets 520 (Φm), the data of |Φc−Φm|/2, the width parallel to the optical axis of the lens 400 of the first coil 610 (W), the smallest air gap which is parallel to the optical axis of the lens 400 between the ring plane 621 of the second coil 620 and the first orthogonal surface 512 of the first magnet 510 (d), the area of the ring plane 621 (A), the area of the enclosed plane 622 (B), and the area of the second sensor surface 721 (C) are listed in the following Table 3.

TABLE 3

3rd Embodiment

| Φc (mm) | 7.13 | d (mm) | 0.60 |
|---|---|---|---|
| Φm (mm) | 6.74 | A (mm) | 7.01 |
| \|Φc − Φm\|/2 (mm) | 0.20 | B (mm) | 1.52 |
| W (mm) | 1.00 | C (mm) | 0.72 |

Figure 9A:
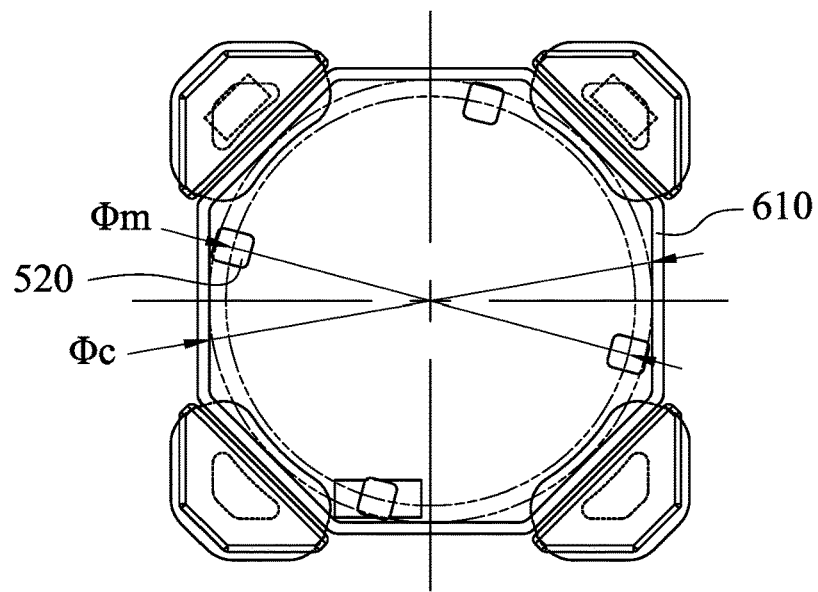
FIG. 9A is a schematic view showing the parameters Φc and Φm of the lens driving module according to the 4th embodiment.
Figure 9B:
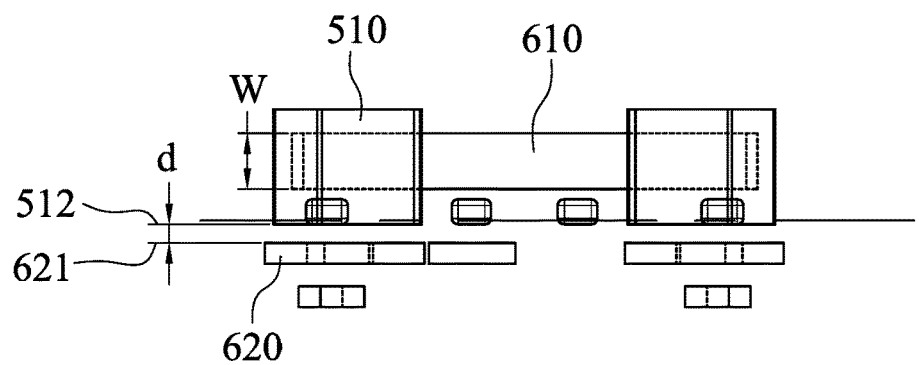
FIG. 9B is a schematic view showing the parameters d and W of the lens driving module according to the 4th embodiment.
Figure 9C:
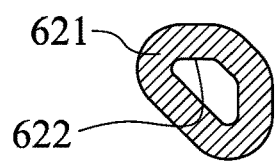
FIG. 9C is a schematic view showing the parameters A and B of the lens driving module according to the 4th embodiment.
Figure 9D:
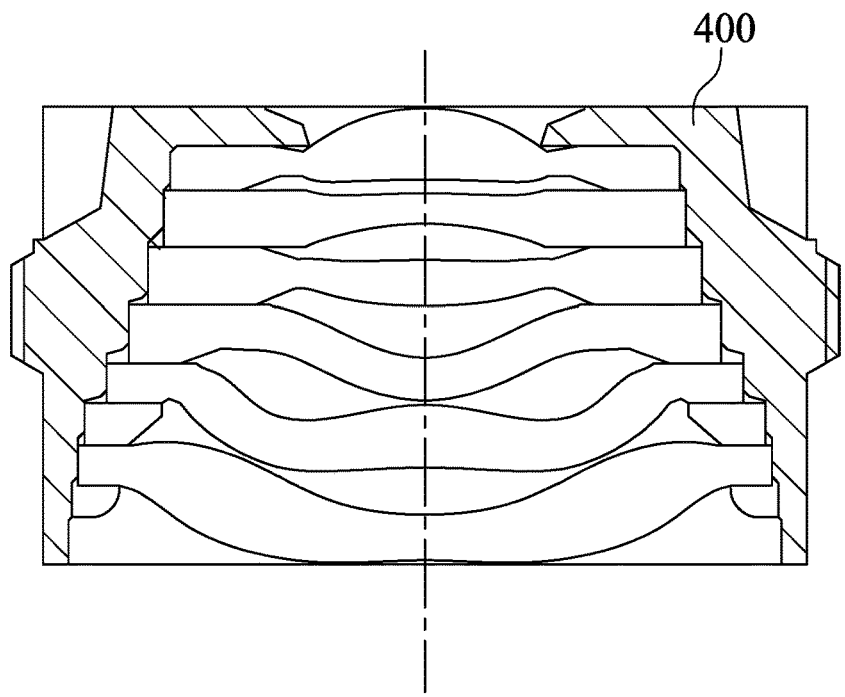
FIG. 9D shows a schematic view of the lens of a lens driving module according to the 4th embodiment.
Figure 9E:
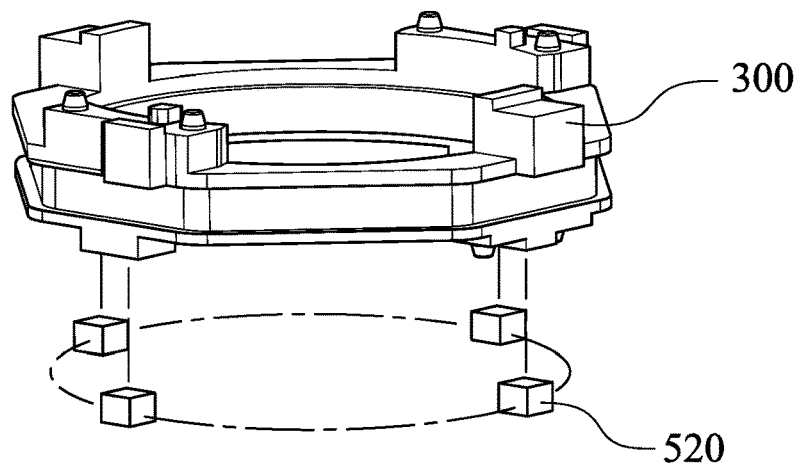
FIG. 9E shows a schematic view of the carrier and the second magnets of the lens driving module according to the 4th embodiment.

FIG. 9A is a schematic view showing the parameters Φc and Φm of the lens driving module according to the 4th embodiment. FIG. 9B is a schematic view showing the parameters d and W of the lens driving module according to the 4th embodiment. FIG. 9C is a schematic view showing the parameters A and B of the lens driving module according to the 4th embodiment. FIG. 9D shows a schematic view of the lens 400 of a lens driving module according to the 4th embodiment. FIG. 9E shows a schematic view of the carrier 300 and the second magnets 520 of the lens driving module according to the 4th embodiment. In FIG. 9D and FIG. 9E, the lens 400 includes six lens elements which are made of plastic material and with refractive power. Therefore, it is favorable for increasing the resolutions of the lens driving module. Furthermore, the number of the second magnets 520 is four, and any two second magnets 520 which are adjacent to each other can be equidistantly disposed on the end toward the holder 100 of the carrier 300 in a circumferential direction, wherein the number of the second magnets 520 should not be limited to the embodiment. Therefore, it is favorable for reducing the skew of the lens 400 so as to enhance the image quality.

In the 4th embodiment of the present disclosure, the diameter of the smallest inscribed circle of the first coil 610 (Φc), the diameter which is the greatest straight-line distance between the centers of any two of the second magnets 520 (Φm), the data of |Φc−Φm|/2, the width parallel to the optical axis of the lens 400 of the first coil 610 (W), the smallest air gap which is parallel to the optical axis of the lens 400 between the ring plane 621 of the second coil 620 and the first orthogonal surface 512 of the first magnet 510 (d), the area of the ring plane 621 (A), the area of the enclosed plane 622 (B), and the area of the second sensor surface 721 (C) are listed in the following Table 4.

TABLE 4

4th Embodiment

| Φc (mm) | 7.14 | d (mm) | 0.30 |
|---|---|---|---|
| Φm (mm) | 6.60 | A (mm) | 2.85 |
| \|Φc − Φm\|/2 (mm) | 0.27 | B (mm) | 0.70 |
| W (mm) | 0.90 | C (mm) | 0.69 |

Figure 10A:
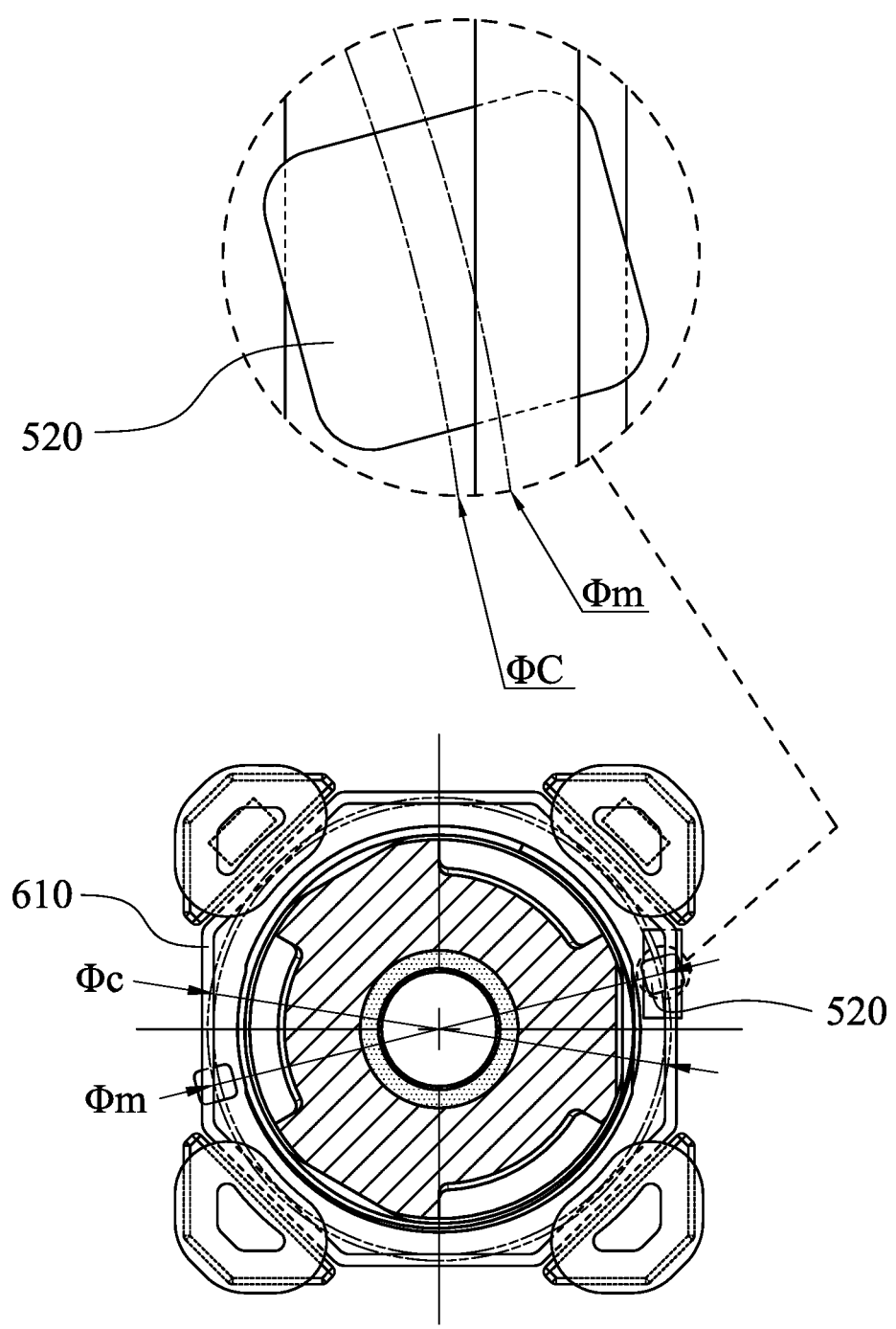
FIG. 10A is a schematic view showing the parameters Φc and Φm of the lens driving module according to the 5th embodiment.
Figure 10B:
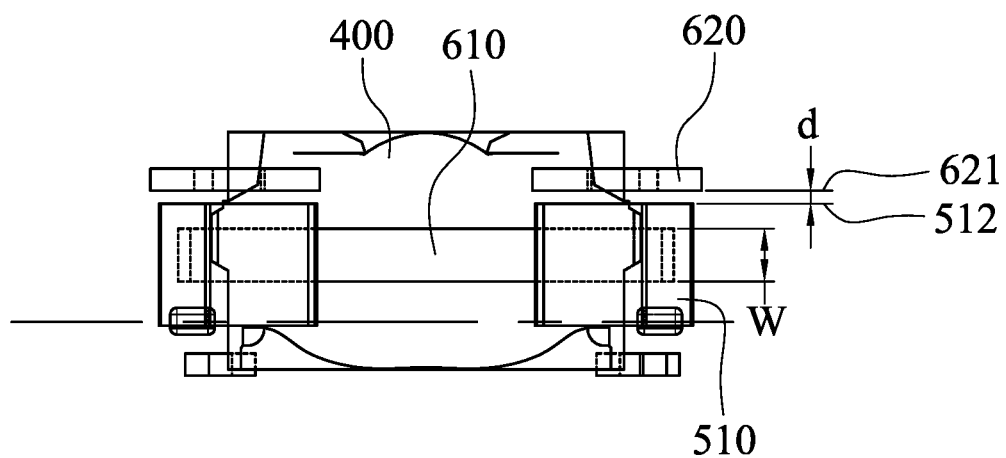
FIG. 10B is a schematic view showing the parameters d and W of the lens driving module according to the 5th embodiment.
Figure 10C:
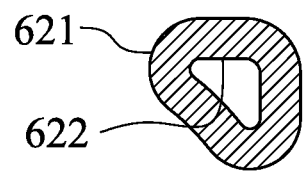
FIG. 10C is a schematic view showing the parameters A and B of the lens driving module according to the 5th embodiment.

FIG. 10A is a schematic view showing the parameters Φc and Φm of the lens driving module according to the 5th embodiment. FIG. 10B is a schematic view showing the parameters d and W of the lens driving module according to the 5th embodiment. FIG. 10C is a schematic view showing the parameters A and B of the lens driving module according to the 3rd embodiment. The elements arrangement in the 5th embodiment is the same as the 1st embodiment, and will not be described again herein.

In the 5th embodiment of the present disclosure, the diameter of the smallest inscribed circle of the first coil 610 (Φc), the diameter which is the greatest straight-line distance between the centers of any two of the second magnets 520 (Φm), the data of |Φc−Φm|/2, the width parallel to the optical axis of the lens 400 of the first coil 610 (W), the smallest air gap which is parallel to the optical axis of the lens 400 between the ring plane 621 of the second coil 620 and the first orthogonal surface 512 of the first magnet 510 (d), the area of the ring plane 621 (A), the area of the enclosed plane 622 (B), and the area of the second sensor surface 721 (C) are listed in the following Table 5.

TABLE 5

5th Embodiment

| Φc (mm) | 7.14 | d (mm) | 0.20 |
|---|---|---|---|
| Φm (mm) | 7.33 | A (mm) | 3.33 |
| \|Φc − Φm\|/2 (mm) | 0.10 | B (mm) | 0.73 |
| W (mm) | 0.80 | C (mm) | 1.05 |

Therefore, when the variation of the magnetic field of the second magnets 520 is detected by the first sensor 710 in the present disclosure, the lens 400 is led to the predetermined position for focusing by the feedback current, so that it is favorable for saving the focusing time. When the variation of the magnetic field of the first magnets 510 is detected by the second sensor 720, the shaking drift amount of the lens 400 is compensated by another feedback current to get the stable image, so that it is favorable for reducing the problems resulted from the camera shake.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. A lens driving module, comprising:
a holder, comprising an opening hole;
a cover coupled to the holder;
a carrier movably disposed in the cover, and for coupling to a lens, wherein a moving direction of the carrier comprises a first direction which is parallel to an optical axis of the lens;
at least one first magnet movably disposed in the cover, wherein a moving direction of the first magnet comprises a second direction which is orthogonal to the optical axis of the lens;
a first coil wound around an outer side of the carrier, and adjacent to the first magnet;
at least one second magnet disposed on one end of the carrier which is toward the holder, wherein the second magnet is displaceable along the first direction;
at least one first sensor which is a Hall sensor, and for determining a relative displacement that has occurred in the first direction between the first sensor and the second magnet via a magnetic field, wherein the magnetic field is varied according to the relative displacement, and the first sensor and the second magnet are in alignment along the first direction;
at least one second sensor for detecting a magnetic field of the first magnet, wherein the magnetic field of the first magnet is varied according to a relative displacement between the second sensor and the first magnet which is detected;
an imaging element for receiving an imaging light of the lens; and
a circuit board, wherein the circuit board and the carrier are arranged along the first direction, and the imaging element is disposed on the circuit board.

2. The lens driving module of claim 1, further comprising:
at least three suspension wires, wherein one end of each of the suspension wires is connected to a suspension plane which is orthogonal to the optical axis of the lens, and the suspension wires are arranged in the same direction which is parallel to the optical axis of the lens.

3. The lens driving module of claim 2, further comprising:
a spacer connected to the first magnet, wherein the carrier is disposed in the spacer.

4. The lens driving module of claim 3, further comprising:
at least one first spring coupled to the end of the carrier which is toward the holder; and
at least one second spring coupled to the other end of the carrier.

5. The lens driving module of claim 4, wherein the second spring is coupled to the spacer and connected to the end of at least one of the suspension wires.

6. The lens driving module of claim 1, wherein the first magnet comprises:
at least one first parallel surface which is parallel to the optical axis of the lens; and
at least one first orthogonal surface which is orthogonal to the optical axis of the lens.

7. The lens driving module of claim 6, further comprising:
at least one second coil which is adjacent to the first magnet while facing the first orthogonal surface.

8. The lens driving module of claim 7, wherein the second coil is disposed on the holder and near the opening hole, and the second coil is adjacent to one side of the first magnet which is toward the holder.

9. The lens driving module of claim 7, wherein the second coil is a band coil being closed loop and comprises a ring plane which is orthogonal to the optical axis of the lens and toward the first magnet.

10. The lens driving module of claim 7, wherein the second coil comprises a ring plane which is orthogonal to the optical axis of the lens and toward the first magnet, a smallest air gap which is parallel to the optical axis of the lens between the ring plane and the first orthogonal surface of the first magnet is d, and the following condition is satisfied:

$$d < 0.7 \text{ mm}.$$

11. The lens driving module of claim 7, wherein the second sensor is disposed near the opening hole of the holder, and the second sensor is adjacent to one side of the first magnet which is toward the holder.

12. The lens driving module of claim 11, wherein the first sensor is disposed near the opening hole of the holder.

13. The lens driving module of claim 8, wherein the second coil is a band coil being closed loop, and the second sensor is corresponding to an enclosed space inside the second coil.

14. The lens driving module of claim 9, wherein the second coil comprises a ring plane which is orthogonal to the optical axis of the lens and toward the first magnet, an area of the ring plane is A, and the following condition is satisfied:

$$2.3 \text{ mm}^2 < A < 8.5 \text{ mm}^2.$$

15. The lens driving module of claim 9, wherein the second coil comprises:
a ring plane which is orthogonal to the optical axis of the lens and toward the first magnet; and
an enclosed plane which is enclosed by the ring plane, an area of the enclosed plane is B, and the following condition is satisfied:

$$0.5 \text{ mm}^2 < B < 2.9 \text{ mm}^2.$$

16. The lens driving module of claim 9, wherein the second sensor comprises a second sensor surface which is orthogonal to the optical axis of the lens, an area of the second sensor surface is C, and the following condition is satisfied:

$$0.35 \text{ mm}^2 < C < 1.5 \text{ mm}^2.$$

17. The lens driving module of claim 1, wherein the second sensor is disposed on the circuit board.

18. The lens driving module of claim 1, wherein the lens comprises at least five lens elements with refractive power.

19. The lens driving module of claim 1, wherein the second sensor comprises a second sensor surface which is orthogonal to the optical axis of the lens, an area of the second sensor surface is C, and the following condition is satisfied:

$$0.35 \text{ mm}^2 < C < 1.0 \text{ mm}^2.$$

20. The lens driving module of claim 1, wherein a number of the second magnet is two to six, and any two second magnets which are adjacent to each other are equidistantly disposed on the end of the carrier in a circumferential direction.

21. The lens driving module of claim 20, wherein a number of the second magnets is two and symmetrically disposed on the end of the carrier.

22. The lens driving module of claim 20, wherein a diameter of a smallest inscribed circle with a center of the first coil is Φc, a diameter which is a greatest straight-line distance between the centers of any two of the second magnets is Φm, a width parallel to the optical axis of the lens of the first coil is W, and the following condition is satisfied:

$$|\Phi c - \Phi m|/2 < W.$$

23. The lens driving module of claim 2, wherein the moving direction of the carrier further comprises the second direction and a third direction, the first direction, the second direction and the third direction are orthogonal to each other, the second sensor is a Hall sensor, and a number of the second sensor is at least two.

24. The lens driving module of claim 23, wherein the moving direction of the first magnet further comprises the third direction.

25. The lens driving module of claim 24, further comprising:
   at least one second coil;
   wherein a number of the first magnet and a number of the second coil are equal, and each of the numbers of the first magnet and the second coil is at least four.

* * * * *